US006637997B2

(12) United States Patent
Ahrns et al.

(10) Patent No.: US 6,637,997 B2
(45) Date of Patent: Oct. 28, 2003

(54) CAPSTAN FOR HANDLING SLITTING TOOLS

(75) Inventors: Rick L. Ahrns, New Bremen, OH (US); Robert L. Schmiesing, Minster, OH (US)

(73) Assignee: Blue IP, Inc., Callery, PA (US)

( * ) Notice: Subject to any disclaimer, the term of this patent is extended or adjusted under 35 U.S.C. 154(b) by 39 days.

(21) Appl. No.: 09/951,197

(22) Filed: Sep. 11, 2001

(65) Prior Publication Data

US 2003/0049099 A1 Mar. 13, 2003

(51) Int. Cl.$^7$ ............................................. B26D 1/24
(52) U.S. Cl. ............................ 414/27; 83/479; 414/908
(58) Field of Search ........................ 83/479; 414/27, 414/908

(56) References Cited

U.S. PATENT DOCUMENTS

| 3,513,743 | A | * | 5/1970 | Montguire ................ 83/433 |
| 3,727,503 | A | * | 4/1973 | Braner et al. ............. 83/479 |
| 4,183,273 | A | * | 1/1980 | Greinke et al. ............ 83/479 |
| 5,158,002 | A | * | 10/1992 | Matsunaga et al. ........ 83/479 |
| 5,450,740 | A | * | 9/1995 | Lovinggood et al. ...... 72/182 |

* cited by examiner

Primary Examiner—Janice L. Krizek
(74) Attorney, Agent, or Firm—Wood, Herron & Evans, LLP

(57) ABSTRACT

A capstan for handling slitting tools comprises a base, a pivoting frame, an outer frame and a plurality of shafts. The pivoting frame is supported by the base for pivotal movement about an axis. The outer frame is supported by the rotating frame for translational movement along the axis. The plurality of shafts extends from the outer frame transversely to the axis. The capstan preferably further includes an axial actuator for translating the outer frame relative to the pivoting frame along the axis. This permits an attendant to raise or lower the outer frame, and, hence, raise or lower the shafts. By thus raising or lowering the shafts, the attendant can adjust the height of the shafts to a comfortable level for loading or unloading knives and spacers without excessive lifting or bending. An optional pusher serves to automatically slide the tools between the capstan and the slitter machine.

18 Claims, 5 Drawing Sheets

CAPSTAN FOR HANDLING SLITTING TOOLS

BACKGROUND OF THE INVENTION

1. Field of the Invention

This invention relates to capstans for use in handling slitting tools for sheet metal slitter machines, and more particularly, to a novel capstan capable of vertical guided movement so as to permit its use at a height convenient to an attendant.

2. Description of the Related Art

A slitter machine uses rotary slitting knives or tools for cutting of sheet metal into strips. More specifically, a plurality of knives and spacers having center holes are slid onto arbors or shafts of the slitter machine. Typically, a slitter machine will include pairs of vertically-spaced arbors. Each arbor induces the knives to rotate as the arbor is turned. The rotating knives cut sheet metal into a plurality of "mults" as the sheet metal passes between the arbors. The arrangement of the knives and spacers on the arbors of the slitter machine must be changed when it is desired to change the number or relative sizes of the mults cut from the sheets passing between the arbors.

A capstan is often used in removing and replacing the knives and spacers. Known capstans include a capstan frame and shafts or arbors which extend from the capstan frame in alignment with the arbors of the slitter machine. The knives and spacers can be slid either manually or mechanically between the shafts of the capstan and the arbors of the slitter machine.

Known capstans typically include a plurality of pairs of shafts which are aligned vertically with the arbors of the associated slitter machine but which extend in different orientations from the capstan frame. This permits an attendant to load knives and spacers onto one pair of shafts while another pair of shafts is aligned to transfer knives and spacers onto, or off of, the arbors of the slitter machine.

One drawback to such capstans relates to the alignment of the shafts with the corresponding arbors of the slitter. Very often, the heights of the shafts of the capstan are such that it is inconvenient for an attendant to load knives and spacers onto the shafts. Typically an attendant must lift the knives and spacers to load them onto an upper arbor and bend to load the knives and spacers onto a lower arbor. There remains a need in the art for a capstan designed to reduce the need for an attendant to have to repeatedly lift or bend in order to manipulate the tools on the capstan.

SUMMARY OF THE INVENTION

This need and others are addressed by a capstan for handling slitting tools comprising a base, a pivoting frame, an outer frame and a plurality fo shafts extending from the outer frame. The pivoting frame is supported by the base for pivotal movement about an axis. The outer frame is supported by the pivoting frame for translational movement along the axis. The plurality of shafts extends from the outer frame transversely to the axis.

The capstan further includes at least one axial actuator for raising and lowering the outer frame relative to the pivoting frame along the axis. The axial actuator permits an attendant to raise or lower the outer frame and thereby raise or lower the shafts to a convenient height for loading and unloading the knives and spacers. Optionally, the capstan includes a pivotal actuator for pivoting the pivot frame about the axis so as to align the shafts with arbors of an associated slitting machine.

The preferred actuators may operate hydraulically, electrically, manually, pneumatically or by any other suitable means which may be known to those of ordinary skill in the art. In accordance with one embodiment of the invention, the pivoting actuator comprises a hydraulic motor having a shaft mounting a pinion gear. The pivoting frame preferably mounts a ring gear engaged by the pinion gear so as to permit the motor to turn the pivoting frame. In accordance with another embodiment, the axial actuator comprises an axial actuator cylinder mounted by the base and an axial actuator piston. The axial actuator piston is slidably received in the axial actuator cylinder such that the axial actuator cylinder restrains the axial actuator piston for translational movement parallel to the axis. The axial actuator piston is positioned so as to press against the outer frame to raise or lower the outer frame in response to fluid pressure in the axial actuator cylinder.

Optionally, a pusher is provided to slide the knives and spacers between the shafts of the capstan and the arbors of the slitter machine. A preferred pusher comprises a pusher frame; a pusher plate; and a pusher actuator, most preferably hydraulic, for inducing the pusher plate to linear movement along one or more of the shafts of the capstan. Most preferably, the pusher includes one or more guide rod restraints and one or more guide rods constrained thereby to move linearly along the one or more shafts. One advantage of the optional pusher is that is relieves the attendant of the need to manually transfer the knives and spacers between the capstan and the slitter machine.

Therefore, it is one object of the invention to provide a novel capstan capable of vertical translational movement so as to permit its use at a height convenient to an attendant. It is another object of the invention to provide for the automatic transfer of the knives and spacers between the capstan and the slitter machine. These and other objects, features and advantages of the present invention will be described in further detail in connection with preferred embodiments of the invention shown in the accompanying drawings.

DETAILED DESCRIPTION OF THE PREFERRED EMBODIMENT

Figure 1:
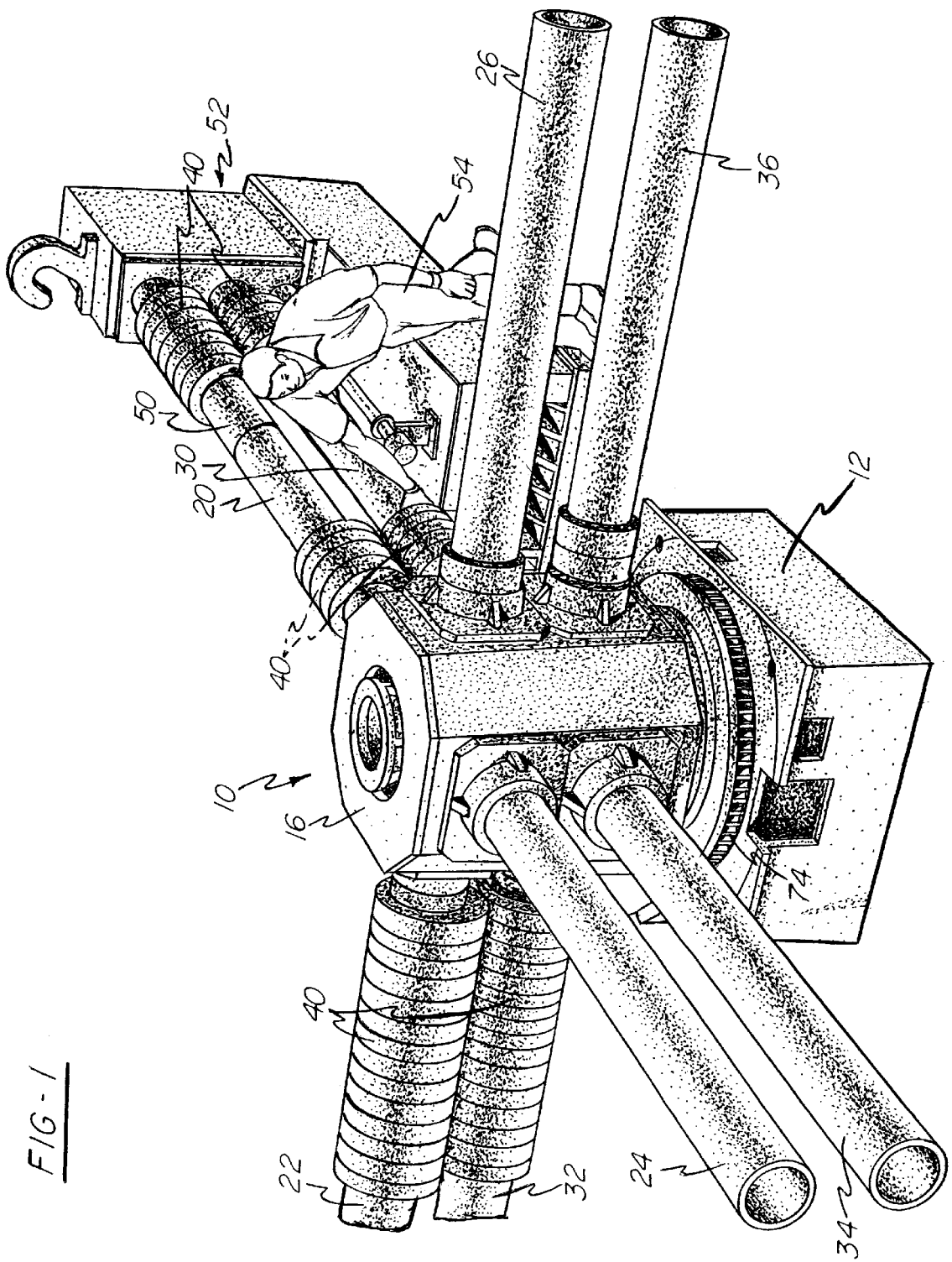
FIG. 1 is a perspective view of a capstan and an associate slitter machine with an attendant.

As best shown in FIG. 1, a preferred capstan 10 includes a base 12; a pivoting frame 14 (FIG. 3); an outer frame 16; and a plurality of arbors or shafts 20, 22, 24, 26, 30, 32, 34 and 36. The shafts 20, 22, 30, 32 are shown supporting knives and spacers 40. The shafts, 20, 30 align with arbors or shafts 50 (only one shown) of a slitter machine 52 to permit an attendant 54 to slide the knives and spacers 40 between the shafts, 20, 30 and the arbors 50. It will be seen from FIG. 1 that, when the shafts 20, 30 are aligned with the arbors 50 of the slitter machine 52, the shaft 20 of the capstan 10 lies at an elevation which would require the attendant to lift the knives and spacers 40 to position the knives and spacers 40 on the shaft 20. Likewise, when aligned with the lower of the two arbors 50, the shaft 30 of the capstan 10 lies at an elevation which would require the attendant to bend in order to position the knives and spacers 40 on the shaft 30.

Figure 2:
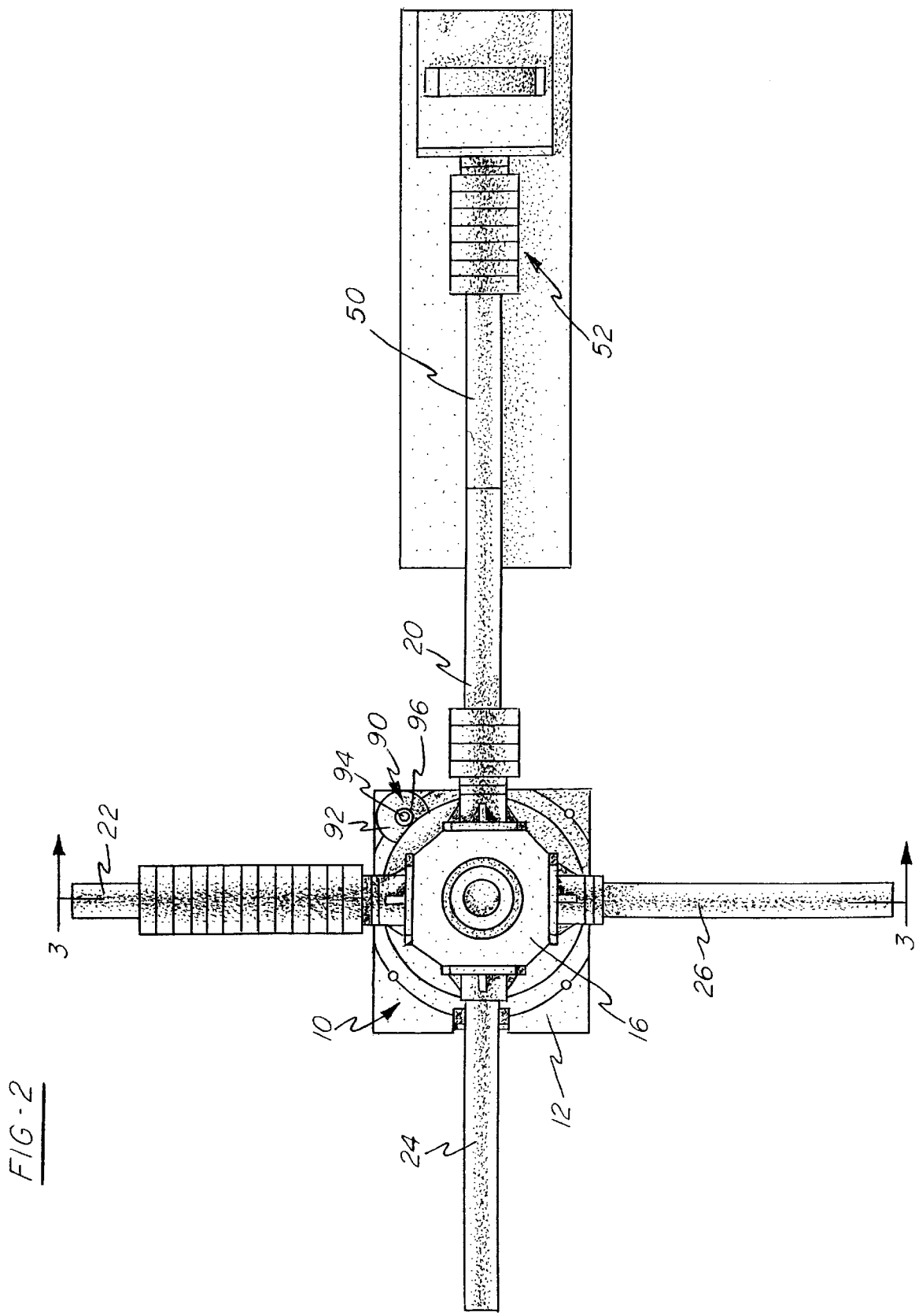
FIG. 2 is a top plan view of the capstan and slitter machine of FIG. 2.

In the preferred embodiment shown in FIG. 2, the set of upper shafts 20, 22, 24, 26 is symmetrically arranged about the outer frame 16. The same is true of the set of lower shafts 30, 32, 34, 36 (FIG. 1). The particular number and orientation of the shafts are not critical to the invention and may be varied as understood by those of ordinary skill in the art.

Figure 3:
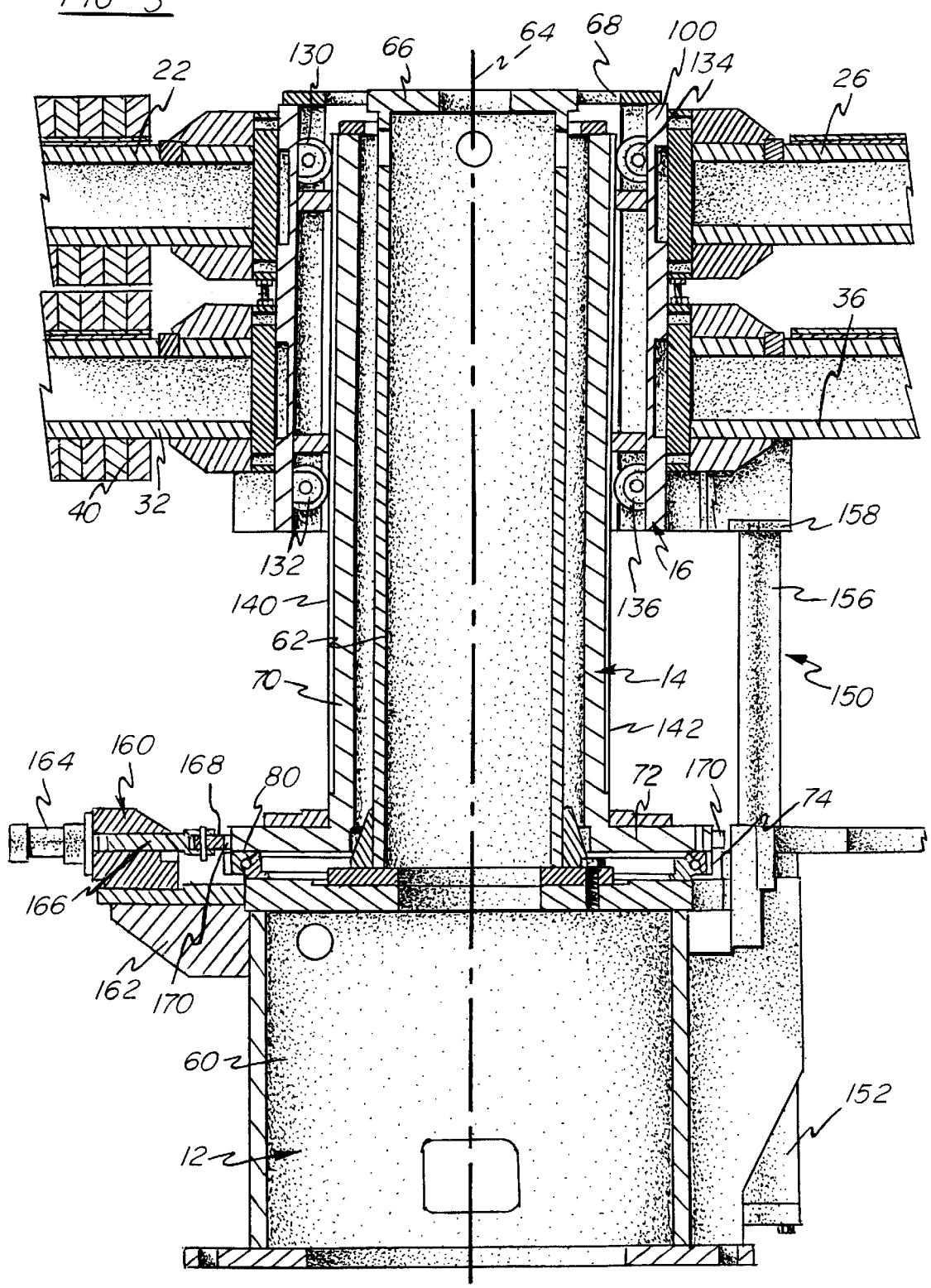
FIG. 3 is a side sectional view of the capstan of FIG. 1.

As best shown in FIG. 3, the preferred base 12 includes a box portion 60 formed from welded steel and an upright metallic portion 62 defining an axis 64. The upright metallic portion 62 mounts a coupling plate or collar 66 for engagement through an opening 68 in the outer frame 16.

The preferred pivoting frame 14 is in the form of a metal structure 70 including a mounting plate 72. The mounting plate 72 mounts a ring gear assembly 74.

The pivoting frame 14 preferably is supported by the base 12 for pivotal movement about the axis 64. Most preferably, the ring gear assembly 74 includes a thrust bearing 80, shown as a roller bearing in FIG. 3, which pivotally supports the pivoting frame 14 while carrying the collective weight of the pivoting frame 14; the outer frame 16; the shafts 20, 22, 24, 25, 30, 32, 34, 36 (FIG. 1); and the knives and spacers 40.

Returning to FIG. 2, the preferred base 12 supports a pivoting actuator 90 which includes a conventional hydraulic motor 92 having a shaft 94 and a pinion gear 96 mounted on the shaft 94. The pinion gear 96 engages the ring gear assembly 74 (FIGS. 1 and 3) for pivotal movement of the pivoting frame 14 in a manner well known to those of ordinary skill in the art. It will be appreciated that the use of a hydraulic motor 92 to turn the pivoting frame 14, while preferred, is not critical to the invention and other types of rotary actuators, or manual rotation, may be used for the same purpose. As shown in FIG. 3, the preferred outer frame 16 includes a box portion 100 formed from welded steel. The box portion 100 supports the shafts 22, 26, 32, 36 (only four shown in FIG. 3).

The preferred outer frame 16 is constrained to move along the axis 64. In the preferred embodiment shown in FIG. 3, the outer frame 16 pivotally mounts a plurality of rollers 130, 132, 134 and 136 (only four shown in FIG. 3). The rollers 130, 132, 134, 136 fit over raised tracks 140 and 142 (only two shown in FIG. 3) positioned on an outer surface of the pivoting frame 14 to constrain the rollers 130, 132, 134, 136 to movement parallel to the axis 64. Those skilled in the art will recognize that the constraining system shown, while preferred, is not critical to the invention and that other suitable means of constraint are within the ordinary skill in the art.

The preferred base 12 supports at least one, and preferably two, axial actuators 150 (only one shown), each of which includes an axial actuator cylinder 152 supported by the base 12 and an axial actuator piston 156 at least partially received in the axial actuator cylinder 152. A plurality of hardened inserts 158 (only one shown) preferably are secured to the outer frame 16 for alignment with the axial actuator piston 156 (only one shown). Most preferably, the axial actuator piston 156 (only one shown) responds to hydraulic pressure in the axial actuator cylinder 152 so as to induce raising or lowering of the outer frame 16 relative to the pivoting frame 14 along the axis 64 so as to adjust the height of the shafts 22, 26, 32, 36. It will be appreciated that the use of a hydraulic pressure to move the outer frame 14, while preferred, is not critical to the invention and other types of manual or powered actuators may be used for the same purpose.

This feature permits the attendant 54 (FIG. 1) to raise or lower the shafts 20, 22, 24, 26, 30, 32, 34, 36 (FIG. 1) to the level most comfortable for the attendant 54 (FIG. 1) when loading knives and spacers 40 (FIG. 1) onto the shafts 20, 22, 24, 26, 30, 32, 34, 36 (FIG. 1). Most preferably, the pivoting frame 14 and the outer frame 16 are constructed so as to provide a range of translational motion to the outer frame such that the level of the upper set of shafts 20, 22, 24, 26 (FIGS. 1 and 2) when the outer frame 16 is at is lowermost position is substantially the same as the level of the lower set of shafts 30, 32, 34, 36 (FIG. 1) when the outer frame 16 is at its uppermost position.

The pivoting actuator 90 (FIG. 2) and the axial actuator 150 (FIG. 3) preferably are regulated by a controller (not shown), such as an electronic, hydraulic or pneumatic controller, in a manner within the ordinary skill in the art. Most preferably, the axial actuator piston 156 (FIG. 3) retracts away from the outer frame 16 before the motor 92 (FIG. 2) is operated and the pivoting frame 14 is pivoted about the axis 64 (FIG. 3). Conventional switches (not shown), such as push button switches or foot pedals, are provided to allow the attendant 54 (FIG. 1) to initiate and control the movement of the pivoting and axial actuators 90 (FIG. 2), 150 (FIG. 3). Nevertheless, the controller (not shown) is not critical to the present invention.

As shown in FIG. 3, the preferred base 12 additionally supports a detent system 160 for limiting the pivotal movement of the pivoting frame 14. More specifically, the base 12 mounts a shelf 162 which, in turn, supports a detent cylinder 164 and a detent piston or detent 166. The detent cylinder 164 at least partially receives the detent 166. The detent 166 includes a cam roller 168 pivotally mounted at an end opposite the detent cylinder 164. The detent 166 moves the cam roller 168 into engagement with lips 170 aligned with the shafts 20, 22, 24, 26, 30, 32, 34, 36 (FIG. 1) so as to limit the pivotal movement of the pivoting frame 14. Most preferably, a controller (not shown) detects the orientation of the pivoting frame 14 and actuates the detent 166 at the proper time to engage the lips 170. Those skilled in the art will recognize that the constraining system shown, while preferred, is not critical to the invention and that other suitable means of constraint are within the ordinary skill in the art.

More specifically, the set of shafts 20, 22, 24, 25 (FIGS. 1 and 2) are arranged symmetrically about the axis 64 (FIG. 3) such that the set of pivotal movements of the pivotal frame 14 which result in alignment of one of the shafts 20, 22, 24, 25 (FIGS. 1 and 2) with the corresponding arbor 50 (FIGS. 1 and 2) of the associated slitter machine 52 (FIGS. 1 and 2) form a symmetry group with respect to the operation of pivotal movement. The interaction of the detent cylinder 164 (FIG. 3) and the detent 166 (FIG. 3) with the lips 170 (FIG. 3) on the pivoting frame 14 limits the permissible pivotal movements of the pivoting frame to this symmetry group. That is, the engagement of the detent cylinder 164 and the detent 166 with the pivoting frame 14 has the effect of limiting the pivotal movement of the pivoting frame 14 to movements which culminate in the alignment of one of the shafts 20, 22, 24, 26 (FIGS. 1 and 2) with the alignment direction of the corresponding shaft 50 (FIGS. 1 and 2) of the slitter machine 52 (FIGS. 1 and 2).

Figure 4:
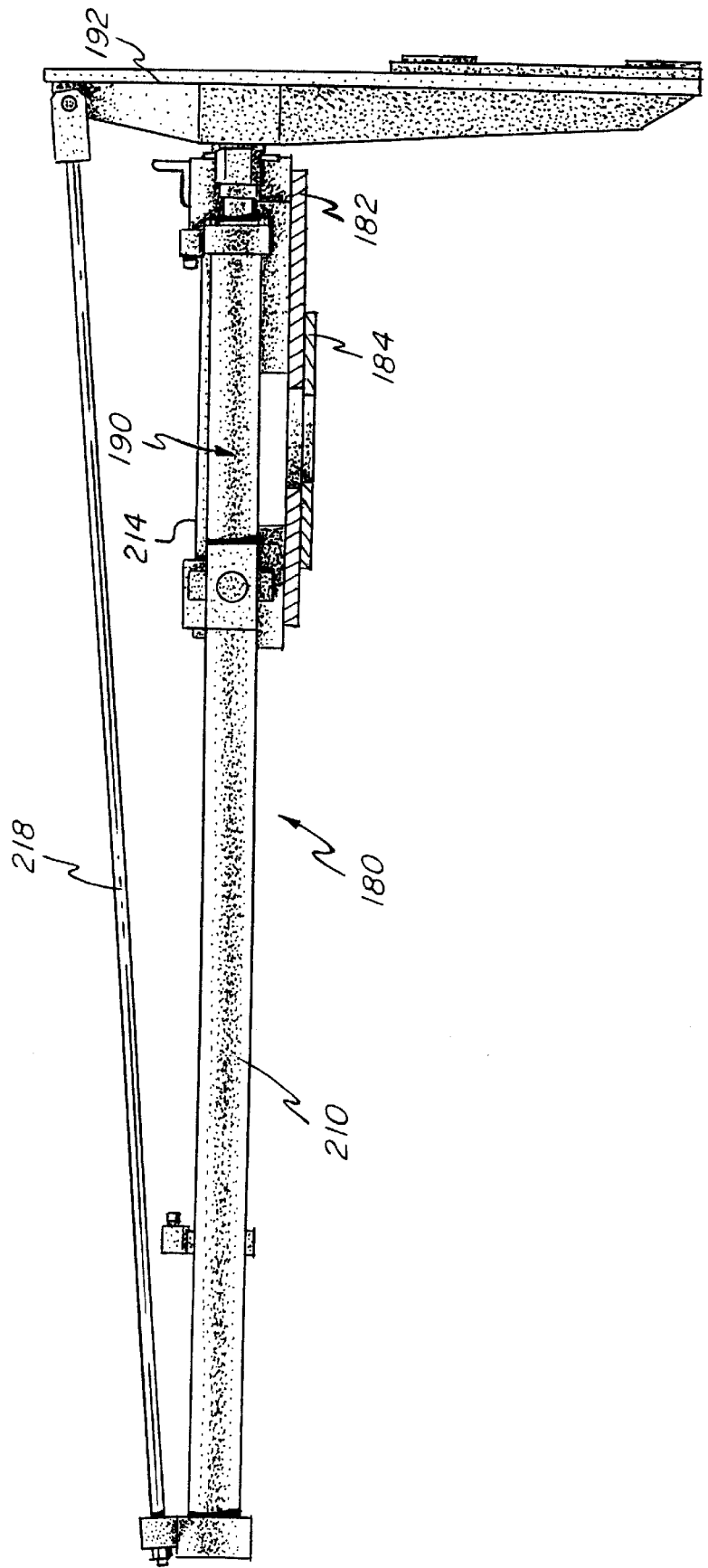
FIG. 4 is a side elevation view of an optional pusher for use with the capstan of FIG. 1.

FIG. 4 shows an optional pusher 180 for use with the preferred capstan 10 (FIGS. 1–3). The pusher 180 includes a pusher frame 182 and a coupling plate or collar 184 affixed to the pusher frame 182 for coupling with the plate or collar 66 (FIG. 3) of the base 12 (FIG. 3) of the capstan (FIGS. 1–3).

Figure 5:
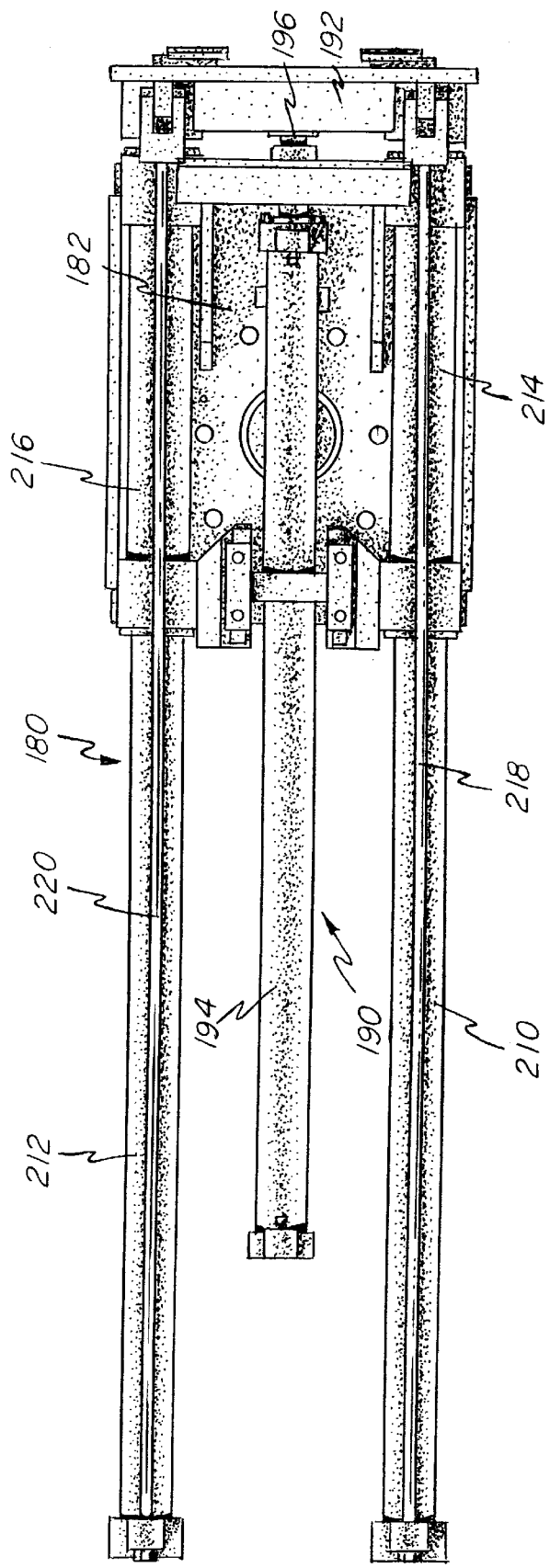
FIG. 5 is a top plan of the pusher of FIG. 4.

The preferred pusher 180 uses a pusher actuator 190 engaged with a pusher plate 192 to slide knives and spacers 40 (FIG. 1) along the shafts 10, 22, 24, 26, 30, 32, 34, 36 (FIG. 1). As best shown in FIG. 5, the pusher actuator 190 includes a pusher cylinder 194 pivotally mounted to the pusher frame 182 and a pusher piston 196 at least partially received in the pusher cylinder 194. The pusher piston 196 is coupled to the pusher plate 192 so as to induce the pusher plate 192 to move in response to pressure (preferably hydraulic pressure) in the pusher cylinder 194. Most preferably, the pusher plate 192 includes a cut-out (not shown) so as to allow the pusher plate 192 to fit over the shafts 20, 22, 24, 26, 30, 32, 34, 26 (FIG. 1) and press against the knives and spacers 40 (FIG. 1) symmetrically on either side of a pair of shafts 20, 30; 22, 32; 24, 34; 26, 36 (FIG. 1). Those skilled in the art will appreciate that the configuration of the pusher plate 192 is not critical to the present invention and that various configurations are available without departing from the scope of the invention.

The preferred pusher 180 further includes a pair of guide rods 210 and 212; a pair of guide restraints 214 and 216; and a pair of connecting rods 218 and 220, which cooperate to regulate the movement of the pusher plate 192. The guide rods 210, 212 are received in the guide rod restraints 214, 216, respectively, so as to constrain the guide rods 210, 212 so as to move only in a direction perpendicular to the axis 64 (FIG. 3) along a pair of the shafts 20, 22, 24, 26, 30, 32, 34, 36 (FIG. 1). End portions of the guide rods 210, 212 and the connecting rods 218, 220 are coupled to the pusher plate 192 so as to constrain the pusher plate 192 to linear motion along one or more shafts 20, 22, 24, 26, 30, 32, 34, 36 (FIG. 1). Those skilled in the art will appreciate that the means of constraining the pusher plate 192 to linear motion along the shafts 20, 22, 24, 26, 30, 32, 34, 36 (FIG. 1) is not critical to the present invention.

One advantage of the optional pusher 180 (FIGS. 4 and 5) is that is serves automatically to slide the knives and spacers 40 (FIG. 1) between the shafts 20, 22, 24, 26, 30, 32, 34, 36 (FIG. 1) of the capstan 10 and the arbors 50 (FIG. 1) of the slitter machine 52 (FIG. 1). The pusher 180 (FIGS. 4 and 5) is of a particularly simple configuration, capable of tooling movement only in a single direction.

From the foregoing, it will be seen that the preferred capstan (FIGS. 1–3) advantageously provides for the raising and lowering of the shafts 20, 22, 24, 26, 30, 32, 34, 36 (FIG. 1). This permits an attendant 54 (FIG. 1) to load knives and spacers 40 (FIG. 1) onto each of the shafts 20, 22, 24, 26, 30, 32, 34, 36 (FIG. 1) while that shaft is at a convenient height, and then to adjust the height of the shafts 20, 22, 24, 26, 30, 32, 34, 36 (FIG. 1) so as to align with the corresponding arbors 50 (FIG. 1) of the associated slitter machine 52 (FIG. 1). The optional pusher 180 (FIGS. 4 and 5) serves to slide the knives and spacers 40 (FIG. 1) automatically between the shafts 20, 22, 24, 26, 30, 32, 34, 36 (FIG. 1) of the capstan 10 and the arbors 50 (FIG. 1) of the slitter machine 52 (FIG. 1), thereby relieving the attendant 54 (FIG. 1) of the need to manually transfer the knives and spacers 40.

Various changes or modifications in the invention described may occur to those skilled in the art without departing from the true spirit or scope of the invention. The above description of preferred embodiments of the invention is intended to be illustrative and not limiting, and it is not intended that the invention be restricted thereto but that it be limited only by the true spirit of and scope of the appended claims.

I claim:

1. A capstan for handling slitting tools comprising:
   (a) a base;
   (b) a pivoting frame supported by said base for pivotal movement about an axis;
   (c) an outer frame supported by said pivoting frame for translational movement along said axis;
   (d) at least one axial actuator for translating said outer frame relative to said pivoting frame along said axis; and
   (e) a plurality of shafts extending from said outer frame transversely to said axis, each said shaft having one end supported by said outer frame and an unobstructed free end remote from said outer frame during translation of said outer frame along said axis.

2. The capstan as recited in claim 1 wherein said pivoting frame mounts a ring gear and said capstan includes a pivoting actuator having a motor with a shaft and a pinion gear affixed to said shaft in engagement with said ring gear for pivoting said pivoting frame.

3. The capstan as recited in claim 1 wherein said axial actuator includes an axial actuator piston restrained for translational movement parallel to said axis for pressing against said outer frame.

4. The capstan as recited in claim 1 wherein said plurality of shafts includes two sets of shafts symmetrically arranged about said axis.

5. The capstan as recited in claim 1 including a detent for engagement with said pivoting frame to limit pivotal movement of said pivoting frame.

6. The capstan as recited in claim 1 wherein said plurality of shafts includes an upper set of shafts symmetrically arranged about said axis end a lower set of shafts symmetrically arranged about said axis, one shaft of one of said upper and lower sets of shafts being oriented in an alignment direction; and wherein said capstan includes a detent for engagement with said pivoting frame to limit pivotal movement of said pivoting frame to movements culminating in another shaft of said upper set of shafts being oriented in said alignment direction.

7. A capstan for handling slitting tools comprising:
   (a) a base;
   (b) a pivoting frame supported by said base for pivotal movement about an axis;
   (c) an outer frame supported by said pivoting frame for translational movement along said axis;
   (d) a pivoting actuator for pivoting said pivoting frame about said axis;
   (e) at least one axial actuator for translating said outer frame relative to said pivoting frame along said axis; and
   (f) a plurality of shafts extending from said outer frame transversely to said axis, each said shaft having one end supported by said outer frame and an unobstructed free end remote from said outer frame during translation of said outer frame along said axis.

8. The capstan as recited in claim 7 wherein said pivoting frame mounts a ring gear; and said pivoting actuator includes a motor having a shaft and a pinion gear mounted on said shaft and engaged with said ring gear for pivoting said pivoting frame.

9. The capstan as recited in claim 7 wherein said at least one axial actuator includes an axial actuator piston restrained for translational movement parallel to said axis for pressing against said outer frame.

10. The capstan as recited in claim 7 including a detent for engagement with said pivoting frame to limit pivotal movement of said pivoting frame.

11. The capstan as recited in claim 7 wherein said plurality of shafts includes an upper set of shafts symmetrically arranged about said axis and a lower set of shafts symmetrically arranged about said axis, one shaft of one of said upper and lower sets of shafts being oriented in an alignment direction; and wherein said capstan includes a detent for engagement with said pivoting frame to limit pivotal movement of said pivoting frame to movements culminating in another shaft of said upper set of shafts being oriented in said alignment direction.

12. Apparatus for handling slitting tools comprising:
   (a) a capstan including
      (i) a base,
      (ii) a pivoting frame supported by said base for pivotal movement about an axis,
      (iii) an outer frame supported by said pivoting frame for translational movement along said axis,
      (iv) at least one axial actuator for translating said outer frame relative to said pivoting frame along said axis, and
      (v) a plurality of shads extending from said outer frame transversely to said axis; and
   (b) a pusher including
      (i) a pusher frame,
      (ii) a coupling affixed to said pusher frame for engaging the capstan,
      (iii) a pusher plate, and
      (iv) a pusher actuator supported by said pusher frame and coupled to said pusher plate for inducing said pusher plate to move linearly.

13. The capstan as recited in claim 12 wherein said pivoting frame mounts a ring gear and said capstan includes a pivoting actuator having a motor with a shaft and a pinion gear affixed to said shaft in engagement with said ring gear for pivoting said pivoting frame.

14. The capstan as recited in claim 12 wherein said at least one axial actuator includes an axial actuator piston restrained for translational movement parallel to said axis for pressing against said outer frame.

15. The capstan as recited in claim 12 including a detent for engagement with said pivoting frame to limit pivotal movement of said pivoting frame.

16. The capstan as recited in claim 12 wherein said plurality of shafts includes an upper set of shafts symmetrically arranged about said axis and a lower set of shafts symmetrically arranged about said axis, one shaft of one of said upper and lower sets of shafts being oriented in an alignment direction; and wherein said capstan includes a detent for engagement with said pivoting frame to limit pivotal movement of said pivoting frame to movements culminating in another shaft of said upper set of shafts being oriented in said alignment direction.

17. The apparatus as recited in claim 12 wherein said pusher actuator includes a pusher piston coupled to said pusher plate and restrained for linear movement.

18. The apparatus as recited in claim 12 wherein said pusher includes at least one guide rod restraint supported by said pusher frame and at least one guide rod constrained by said at least one guide rod restraint for linear movement, said at least one guide rod being coupled to said pusher plate.

* * * * *